D. F. FESLER.
LUBRICATING APPARATUS.
APPLICATION FILED DEC. 21, 1918.
1,315,484.
Patented Sept. 9, 1919.
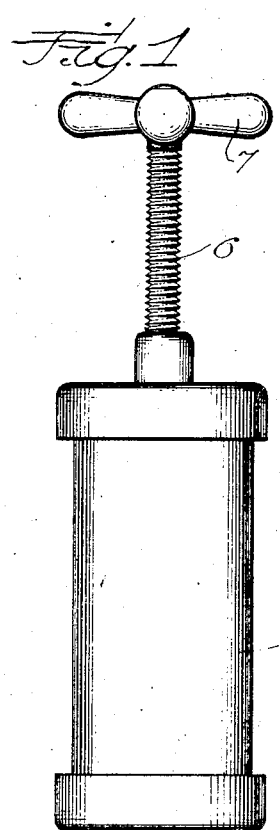
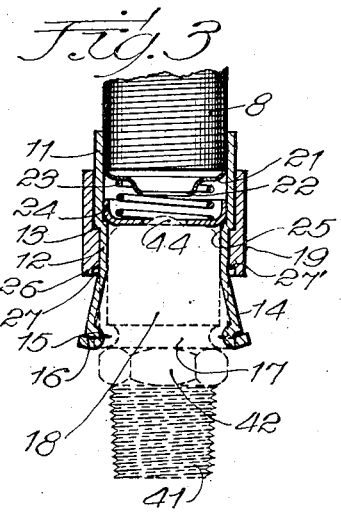
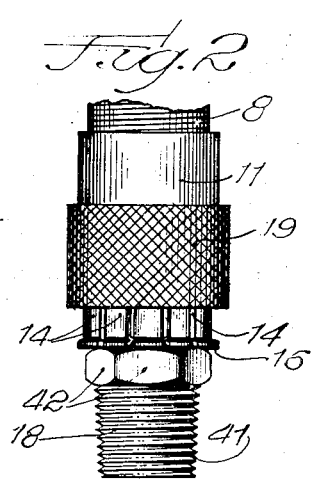
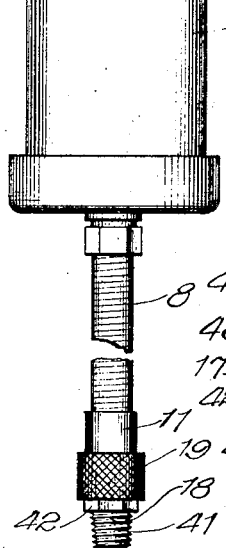
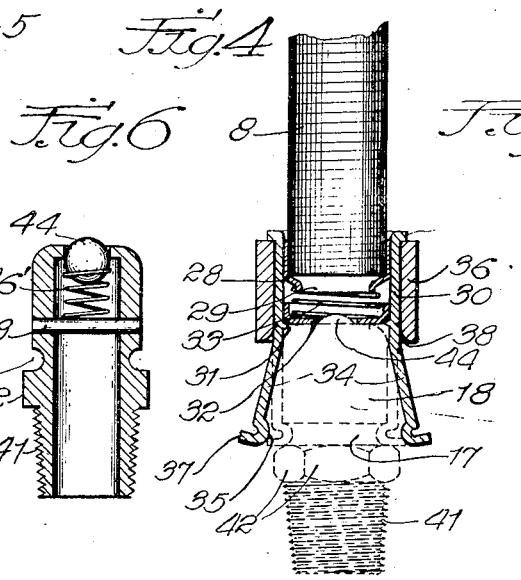
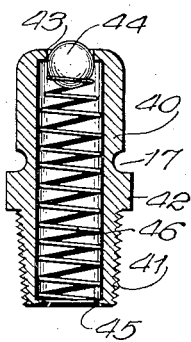
Witnesses:
Andrew Wintercorn
Earl F. Pierce
Inventor
Douglas F. Fesler
By Williams, Bradbury & Lee
Attys.

UNITED STATES PATENT OFFICE.

DOUGLAS F. FESLER, OF EVANSTON, ILLINOIS.

LUBRICATING APPARATUS.

1,315,484.  Specification of Letters Patent.  Patented Sept. 9, 1919.

Application filed December 21, 1918. Serial No. 267,758.

*To all whom it may concern:*

Be it known that I, DOUGLAS F. FESLER, a citizen of the United States, residing at Evanston, in the county of Cook and State of Illinois, have invented a certain new and useful Improvement in Lubricating Apparatus, of which the following is a full, clear, concise, and exact description, reference being had to the accompanying drawings, forming a part of this specification.

My invention relates to improvements in lubricating apparatus, and is especially concerned with improvements in lubricating apparatus of the type disclosed in the application of Arthur V. Gullborg, Serial No. 216,586, filed February 11, 1918. This application discloses means for successively supplying a lubricant under high pressure to a plurality of bearings. This means comprises a grease gun having a screw-threaded plunger and a flexible nozzle, a coupling member or a grease cup secured to each of the bearings to which lubricant is to be applied, and a co-acting coupling member on the discharge end of the grease gun for successively connecting the nozzle of the grease gun with the various coupling members secured to the bearings. In the structure disclosed in the Gullborg application the grease cup or coupling member on the bearing and the coupling member on the nozzle of the grease gun are provided with co-acting means forming a bayonet joint. To connect the two coupling members disclosed by this application, it is necessary to give the coupling member on the grease gun a rotary motion. The grease cup or coupling members on the bearings are sometimes so located that it is inconvenient to give this rotary motion to the coupling member on the grease gun, and one of the objects of my present invention is to provide means for connecting the coupling member on the grease gun to the coupling members on the bearings which will not require a rotary motion of the former.

Another object of my invention is to provide means by which the coupling member of the grease gun can be connected with the coupling member on the bearing by the movement of a member longitudinally of the nozzle of the grease gun and also longitudinally of the coupling members secured to the bearings.

Further objects of my invention are to provide a structure of the character described above which can be easily and economically manufactured.

A still further object of my invention is to provide means for quickly and easily connecting the grease gun to a coupling member or grease cup and disconnecting it therefrom; and another object of my invention is to provide a novel type of coupling member or grease cup to be used in conjunction with my improved grease gun.

Other objects will appear as the description progresses, reference being had to the accompanying drawings, in which:

Figure 1 is a side elevation of my grease gun, showing the discharge nozzle thereof connected to my novel grease cup or coupling member, a portion of the flexible nozzle being broken away;

Fig. 2 is a side elevation on an enlarged scale showing the coupling member on the discharge end of my improved grease gun and my novel grease cup or coupling member;

Fig. 3 is a central longitudinal section through the structure shown in Fig. 2;

Fig. 4 is a central longitudinal section through a modified form of coupling member;

Fig. 5 is a central longitudinal section through a coupling member or grease cup which I provide to be secured to the bearing to be lubricated, this coupling member having special features co-acting with certain parts of the coupling member on my improved grease gun; and Fig. 6 is a central longitudinal section through a modified form of coupling member to be secured to the bearing to be lubricated.

Referring to the drawings, the reference character 5 indicates the barrel or cylinder of my improved grease gun, in which is mounted a piston (not shown) that is reciprocated in the barrel by means of the screw-threaded plunger 6, which can be turned by means of the handle 7. The reference character 8 indicates the flexible metallic discharge nozzle, which may be made of any suitable flexible metallic conduit having the necessary strength to resist the pressures employed for forcing the lubricant into the bearings.

The construction thus far described is illustrated and described in the application of Arthur V. Gullborg referred to above, and I do not claim any invention in the details thereof.

The improved coupling member secured to the free end of the flexible nozzle 8 comprises a metallic sleeve 11 one end of which receives and is soldered to the free end of the flexible nozzle 8. The sleeve is offset at a point intermediate its ends to form a portion 12 of reduced diameter and an annular shoulder 13. The free end of this reduced portion is slotted to provide a plurality of spring tongues 14 which tend to spring outwardly. The free ends of the spring tongues 14 are bent inwardly as shown at 15 and then outwardly as shown at 16 to provide a plurality of lugs or projections which are adapted to be received in the annular grooves 17 in the coupling member 18. The ends of the portions 16 project slightly beyond the faces of the spring tongues for a purpose which will be referred to later on. A clamping sleeve 19 is slidably mounted upon the sleeve 11 and is provided with an annular inwardly extending rib 20 which engages the shoulder 13 of the sleeve 11 to limit its movement in one direction, and to engage the portions 16 of the spring tongues to prevent the clamping sleeve 19 from being forced off the free end of the sleeve 11. A ferrule 21 rests against the end of the flexible nozzle 8 and has a reduced portion 22 which is surrounded by one end of the spring 23. The other end of the spring 23 forces the cup leather or gasket 24 toward the discharge end of the coupling member. It is prevented from being completely forced out of the coupling member by the shoulder 25 formed by the offset portion of the sleeve 11.

In using my improved grease gun and coupling members the sleeve 11 is placed in position to receive the upper end of the coupling member 18, as shown in Fig. 3, and the clamping sleeve 19 is then moved toward the free end of the sleeve 11, whereupon the spring tongues 14 are forced inwardly against the sides of the coupling member 18 and the projections on the ends of the spring tongues are forced into the groove 17 in the coupling member 18. It should be noted that the inner sides of the lugs or projections formed by the portions 15 and 16 are inclined or rounded. The dimensions of the spring tongues and the offset portion of the sleeve 11 are so proportioned relatively to the distance between the top of the coupling member 18 and the edge of the groove 17 that when the lugs or projections on the free ends of the spring tongues are forced inwardly, the inclined portion of these lugs co-acts with the adjacent edge of the groove 17 to pull the sleeve 13 a slight distance downwardly and thus cause the cup leather 24 to be slightly displaced from the seat formed by the annular shoulder 25, and to be held against the end of the coupling member 18 by the tension of the spring 23, thereby providing sealing contact between the cup leather or gasket 24 and the coupling member 18.

It should be noted that the sleeve 19 extends downwardly beyond the rib 20 as shown at 26, thereby forming an annular recess 27 entirely around the lower end of the clamping sleeve 11. This recess is provided for receiving the end portions of the parts 16 which project beyond the faces of the spring tongues 14 and when the clamping sleeve 19 is forced far enough toward the free end of the sleeve 11 so that the ends of the part 16 are received in the recess 27, these ends rest against the part 26 of the sleeve 19 and form a support for these parts which will prevent them from springing outwardly when the plunger in my grease gun is actuated to force the lubricant into the coupling member 18 under high pressure. The leading edge of the rib 20 is slightly rounded as indicated at 27 to prevent it from cutting into the spring tongues 14 when it is actuated to spring these tongues inwardly against the coupling member 18.

In Fig. 4 I have illustrated a modified form of coupling member which comprises a ferrule 28 having a reduced end portion 29, which is soldered or otherwise secured to the end of the nozzle 8. One end of a metallic sleeve 30 surrounds the ferrule 28 and is soldered or otherwise secured thereto. The metallic sleeve 30 is spun inwardly at a point intermediate its ends to form an inwardly extending shoulder 31 which provides a limiting abutment for the cup-shaped gasket 32. This gasket is urged downwardly against the top of the coupling member 18 by means of a spring 33, one end of which rests against the gasket 32 and the other end of which surrounds the reduced portion 29 of the ferrule 28 and rests against the shoulder formed by this ferrule.

The lower end of the sleeve 30 is slotted to provide a plurality of spring tongues 34 which receive the upper end of the coupling member 18. The free ends of the spring tongues 34 are beaded inwardly as shown at 35. These beads or shoulders are adapted to be received by the groove 17 formed in the coupling member 18, as described above. The clamping sleeve 36 is slidably mounted upon the sleeve 11 and acts to clamp the spring tongues 34 against the coupling member 18 in the manner described in connection with the preferred embodiment of my coupling member. The ends of the spring arms 34 are flanged outwardly as shown at 37 to provide stops to prevent the sleeve 36 from sliding off the end of the sleeve 30. The inner leading edge of the sleeve 36 is rounded off as shown at 38 to prevent it from cutting into the spring tongues 34. It is thought unnecessary to describe the operation of this structure, as it will be sufficiently understood from the description of the operation of the coupling member disclosed in Fig. 3.

In Fig. 5 I have illustrated my improved coupling member as comprising an elongated tubular member 40 provided at one end with screw threads 41 by means of which it can be secured to the part to be lubricated, and having facets 42 intermediate its ends to form surfaces for co-acting with a wrench. The groove 17 is formed intermediate the ends of the coupling member to receive the inwardly projecting portions of the spring tongues of my coupling members. One end of the tubular member is flanged inwardly as shown at 43 to provide a seat for the ball valve or closure 44, and the other end of the tubular member is flanged inwardly as shown at 45 to provide a stop for one end of the spring 46. The other end of the spring 46 engages the inner side of the ball closure 44 and urges it against the seat formed by the flange 43.

The modified form of coupling member disclosed in Fig. 6 is similar to that shown in Fig. 5, except that the spring 46' is shorter than that disclosed in Fig. 5, and its lower end is supported by a pin 48 which has its ends inserted in suitable apertures in the walls of the coupling member.

It is thought that the method of using my improved lubricating apparatus will be clear from the above description, and it should be especially noted that the discharge nozzle can be connected with the grease cup or coupling member on the bearing by merely moving the clamping sleeves in a direction longitudinally of the nozzle 8 or parallel with the length of the coupling member 15.

While I have described the details of the preferred embodiments of my invention, it is to be understood that it is capable of other adaptations and modifications within the scope of the appended claims.

Having thus described my invention, what I claim is:

1. A flexible conduit, a sleeve having one end secured to the discharge end of said conduit and the other end slotted to provide a plurality of spring tongues, the free ends of said spring tongues being provided with inwardly and outwardly extending projections, a clamping sleeve surrounding said first-named sleeve and slidably mounted thereon, a shoulder extending inwardly intermediate the ends of said sleeve, and a gasket supported by said shoulder.

2. The combination with a conduit of a coupling member comprising a sleeve, having one end secured to said conduit, the other end of said sleeve being slotted to provide a plurality of spring tongues, a flexible gasket slidably mounted in said sleeve, a spring confined between said flexible gasket and the end of said conduit, a sleeve slidably mounted on said first named sleeve, and means forming a part of said sleeve for retaining said gasket in said sleeve against the action of said spring.

3. The combination with a conduit of a coupling member comprising a sleeve, having one end secured to said conduit, the other end of said sleeve being slotted to provide a plurality of spring tongues, inclined lugs extending inwardly from the free ends of said tongues, a gasket slidably mounted in said sleeve, a spring tending to urge said gasket toward the free ends of said springs, and a sleeve surrounding said first named sleeve and slidably mounted thereon.

4. The combination with a conduit of a coupling member comprising a sleeve having one end secured to said conduit, the other end of said sleeve being slotted to provide a plurality of spring tongues, a gasket yieldably mounted in said sleeve, a second coupling member adapted to be received by said sleeve, and means co-acting with said spring tongues and said second coupling member for moving said sleeve relative to said second coupling member to yieldably hold said gasket against said coupling member.

In witness whereof, I hereunto subscribe my name this 9th day of December, 1918.

DOUGLAS F. FESLER.

Witnesses:
EDNA V. GUSTAFSON,
FAE PETRIE.